Sept. 23, 1930.  E. C. JOHNSTONE  1,776,287
TANK ALARM SWITCH
Filed July 26, 1927  2 Sheets-Sheet 1
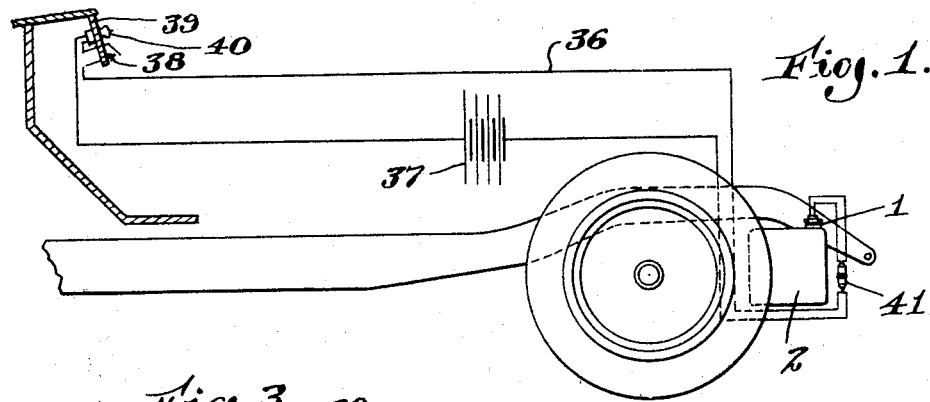
Fig. 1.
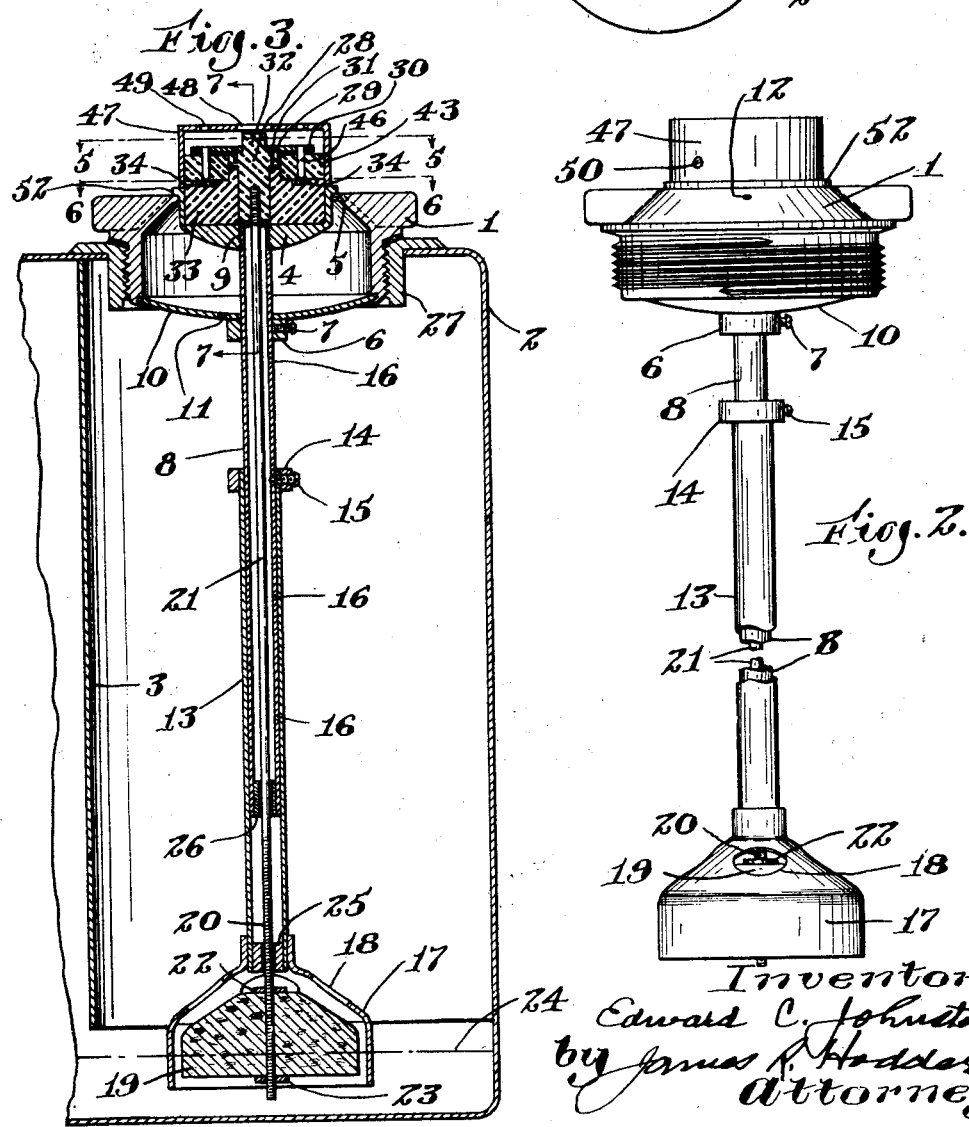
Fig. 3.
Fig. 2.
Inventor
Edward C. Johnstone
by James R. Hodder
Attorney Sept. 23, 1930.  E. C. JOHNSTONE  1,776,287
TANK ALARM SWITCH
Filed July 26, 1927  2 Sheets-Sheet 2
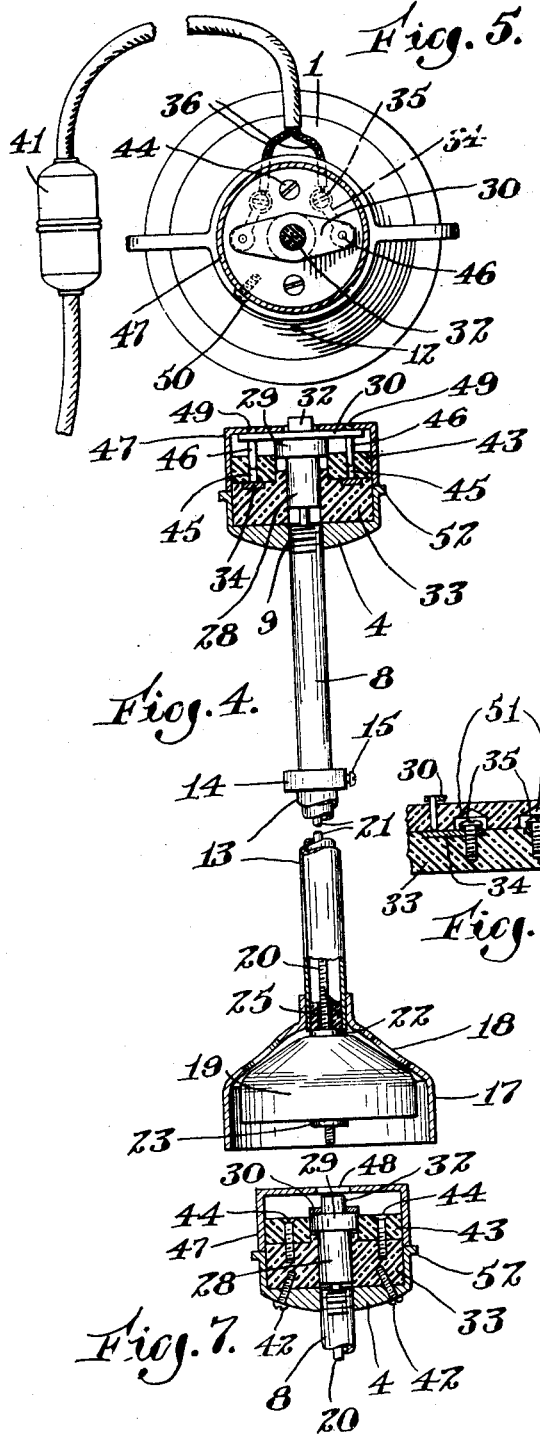
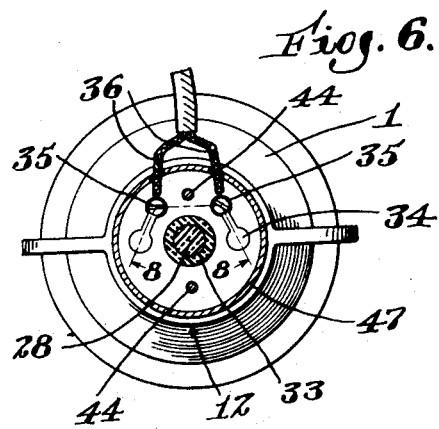
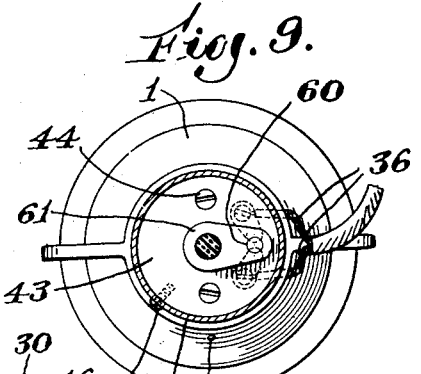
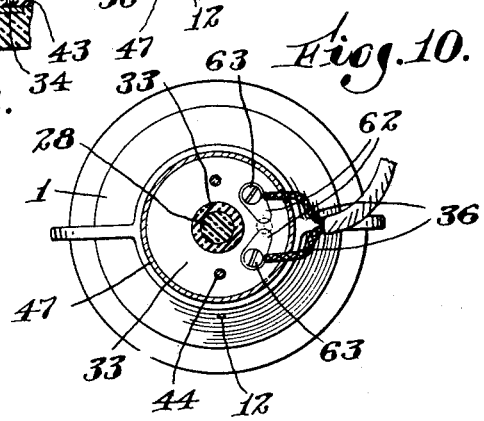
Inventor
Edward C. Johnstone
by James R. Hodder
Attorney Patented Sept. 23, 1930

1,776,287

UNITED STATES PATENT OFFICE

EDWARD C. JOHNSTONE, OF NEWARK, NEW JERSEY, ASSIGNOR, BY MESNE ASSIGNMENTS, TO FILM-EAU CORPORATION, OF NEWARK, NEW JERSEY, A CORPORATION OF NEW JERSEY

TANK-ALARM SWITCH

Application filed July 26, 1927. Serial No. 208,614.

My present invention relates to alarms, and more particularly to alarms for use in liquid tanks, to apprise an operator when a predetermined level of liquid in said tank has been reached, and is particularly applicable to the fuel supply tanks of motor vehicles.

Many devices have heretofore been devised for the purpose of warning an operator when the fuel in the tank is low, but none of these, so far as I am aware, has been satisfactory, in that they have been susceptible to getting out of adjustment, inaccurate, and otherwise faulty, so that the operator does not rely on such present indicators or alarms after having found their unreliability.

My present device obviates these difficulties, being positive in operation, simple, efficient and accurate.

An important object of the present invention is the provision of a tank alarm of this nature, which may be set to indicate a predetermined or desired level in the tank, and upon the liquid or fuel reaching that level, an alarm, whether visual or audible, will be operated, apprising the operator in ample time that more fuel is requisite, or that he has only an amount of fuel to operate the vehicle for a given distance. Some operators may desire to be apprised of this fact when they have but a gallon of fuel left in the tank; others may desire a greater leeway, and my device is simply and readily adjustable to any predetermined level desired, it requiring but little skill to so adjust the device.

I preferably combine my novel tank alarm with the filling cap of a tank, although this is optional, but I locate the device in that position for convenience, rather than to cut or form another recess or aperture through the tank, with consequent necessary soldering, welding or the like.

My device comprises a head in which are positioned one or more contact points, and one or more contact plates, electrically controlled so that when coming in contact with each other, an alarm, within sight or sound of the operator, will function.

The contact points are associated with a rod or wire, depending through the head and through a tubular member secured thereto, and at the bottom of the rod or wire is affixed a float of any desired nature, preferably cork or the like, although a hollow float may be utilized if desired. Surrounding the first mentioned tubular member is a second tubular member, having secured to the bottom thereof a bell, within which the float fits, this bell serving as a guard and protector for the float and wire or rod, and preventing injury thereto when the device is laid on its side, or in other positions in which injury might result to the device. Apertures are provided through the bell to permit free action of the liquid in the tank upon the float. Means are provided to prevent the contact points from rising too high from the contact plates, so that they will always be guided into said plates on lowering or sinking of the float. The contact points, as well as the plates, are embedded in insulating material, and apertures are provided, adjacent thereto, for the escape of any gas, thus eliminating the danger of igniting gases which might be retained within the head.

The lower portion of the rod on which the float is mounted is threaded, and a pair of threaded washers or collars are provided, one above and one below the float, so that the float can be set to any predetermined position upon the wire, and the outside tubular member is telescopic upon the inner tubular member, means being provided to retain the outer tubular member in its adjusted position. It will be appreciated that the bell secured to the outer tubular member will also be adjusted on movement of said tubular member, thus always performing its function of guarding and protecting the float.

In order to permit the filling cap, to which the alarm is attached, to be removed from the tank as heretofore, I provide said cap freely rotatable about the head of the alarm, so that the cap can be rotated without disturbing the relative position of the alarm mechanism, and also I provide any desirable connection adjacent to the device, so that the wires leading therefrom may be separated, and the cap and alarm device removed from the tank without injury to the wires.

I also provide means to limit the upward movement, both of the float and of the movable portion of the head carrying the contact points, and provide in the fixed portion of the head, recesses or holes in which the contact points are guided and concealed. The amount of vertical movement is so limited that it is impossible for these contact points to rise out of these recesses, and therefore, on lowering of the float, and hence of the contact points, they will be positively seated against their respective contact plates. When utilizing but a single contact point, the same principle is followed, except that the contact plates are so arranged that the contact point will engage both of said plates simultaneously, thus functioning equally as well and efficiently as when two contact points are utilized.

The alarm may be located in any desirable position, preferably on the dash board, and power may be obtained from any suitable source, such as the battery of an automobile.

I have found that my device, in operation, is extremely accurate and satisfactory, and gives ample warning of the decrease of the amount of fuel in the tank.

Any suitable switch or means may be provided adjacent the alarm so that the operator may shut off the alarm after being acquainted of the fact that the predetermined low level has been reached in the tank.

I believe that this device is novel, and I have therefore claimed the same broadly herein.

It will be appreciated that, while I have illustrated my device as applied to the fuel tank of a motor vehicle, that it is not limited to this use, but may be utilized in connection with any tank where warning is desired upon the liquid of the tank reaching a predetermined level.

In usual tank construction there is a chamber provided around the filling spout, as shown in the drawings, this being of relatively small size and to prevent excessive splashing of the liquid within the tank. This will also prevent vertical vibration of the float, to a great degree, but even if such vibration were present, the only result would be a slight, intermittent, operation of the alarm, and the operator would readily know the cause of same, the alarm, when the liquid has reached its predetermined low level, being a constant alarm, rather than intermittent.

Further features of the invention, details of construction, combinations of parts, and advantages, will be hereinafter more fully pointed out and claimed.

Referring to the drawings, illustrating a preferred embodiment of the present invention, Fig. 1 is a diagrammatic view of my device installed in a motor vehicle;

Fig. 2 is a side elevation of the tank alarm device;

Fig. 3 is a medial sectional view;

Fig. 4 is a side elevation, partly in section, with the contact points removed from the contact plates;

Fig. 5 is a cross-sectional view on the line 5—5 of Fig. 3;

Fig. 6 is a cross-sectional view on the line 6—6 of Fig. 3;

Fig. 7 is a vertical sectional view on the line 7—7 of Fig. 3;

Fig. 8 is a cross-sectional view on the line 8—8 of Fig. 6;

Fig. 9 is a cross-sectional view corresponding to Fig. 5, with but a single contact point; and Fig. 10 is a cross-sectional view corresponding to Fig. 6, with but a single contact point.

As shown in the drawings, my present device is attached to the filling cap 1 of a tank 2, preferably in a compartment formed by a wall or web 3, this web being usual tank construction and for the purpose of preventing excessive splashing around the filling opening. The head 4 of my device is inserted in a recess 5 formed in the cap 1 and is secured in position by a collar 6 and set screw 7 bearing against and surrounding the depending tubular member 8 threaded to the head 4 as shown at 9, which tubular member passes through a recess in the lower web 10 of the cap 1.

Gas or vapor is allowed to escape to the outer air through the cap 1 by means of an aperture 11 in the web 10 and an aperture 12 in the cap 1. Fitting over the tubular member 8 and telescopic thereon, is a second tubular member 13 having a collar 14 and set screw 15, the set screw 15 being provided with a reduced inner end portion adapted to engage apertures or recesses 16 formed in the inner tubular member 8, so that the tubular member 13 can be raised or lowered to any desired position, and then secured in that adjusted position.

On the lower portion of the member 13 is affixed a bell 17 provided with holes or apertures 18 to permit free passage of fuel or other liquid into and through said bell. Housed within the bell 17 is a float 19, of any desirable or suitable construction, here illustrated as cork, although I may use a hollow float if desired, or any other convenient form. The float 19 passes over the threaded end 20 of a rod or wire 21, a pair of threaded washers 22 and 23 being provided to adjust the float to any desired height on the rod 21 and maintain the float in said adjusted position. This float is adapted to be supported by the liquid in the tank, here indicated as at 24, a recessed plug 25 in the tubular member 13 limiting the upward movement of the float by engaging the threaded washer 22 when the float rises a predetermined distance. This threaded plug serves as a guide for the rod 21, as does also a similar guiding plug 26 in the lower end of the tubular member 8. The function of the bell 17 is primarily to serve as a guard for the float 19 and rod 21, preventing damage or injury thereto when the same is removed from the tank.

The cap 1 is threaded into a threaded collar or flange 27 surrounding the filling opening of the tank 2, and may be freely rotated, in said threaded collar 27, and around the head 4, without causing rotation of the head 4, the collar 6 not being so tight as to cause a jamming of the head 4 to the cap 1.

The upper end of the rod 21 is threaded into an insulating member or plug 28 having a collar 29, an arm 30 being secured to the insulating member by pins 30 entering the collar 29, the arm 30 having a recess formed centrally thereof adapted to be entered by the reduced upper end 32 of the plug 28. The head 4 is formed cup-shaped, and carries in said cup an insulating block 33 in which are positioned a pair of contact plates 34, secured to the block 33 by screws 35, to which screws lead current conducting wires 36 leading from any suitable source of power, such as the battery 37 of a motor vehicle, as shown. The wires 36 lead thence through a suitable switch 38, preferably on the dash 39, and to an alarm 40, which may be either audible or visual, the switch being for the purpose of permitting the operator to turn off the alarm after it has functioned or operated.

Any suitable connection 41 is provided, to permit the wires 36 to be separated or detached to allow the device to be withdrawn from the tank 2 together with the cap 1, without stretching, breaking, or damaging the wires 36. The block 33 is secured in the cup of the head 4 by screws 42, and secured to the block 33 by screws 44 is a further insulating block 43, provided with recesses 45, which serve as guides for the contact points 46 affixed to the arm 30.

A cap 47 surrounds the block 43, and the upper part of the plug or block 33, being secured to the block 33 by a screw 50 or the like. A recess 48 is provided in the upper central part of the cap 47, to permit the reduced upper end 32 of the plug 28 to rise and fall therethrough, smaller recesses 49 being provided at spaced intervals to allow the escape of any gas or vapor which may rise through the tubular members 8 and 13, thus insuring against danger of fire should any sparks occur between the contact points and contact plates. However, since the said contact plates and contact points are sunk in the insulating blocks 33 and 43, all danger of such sparking is eliminated, resulting in a device with a great degree of safety.

Recesses 51 are provided in the block 43 to accommodate the screws 35 holding the contact plates 34 to the block 33.

The head 4 is provided with a flange 52 which seats on the edge of the recess 5 in the cap 1.

The operation of my device is extremely simple, and yet positive, and will be readily understood and appreciated by those skilled in this art.

The float 19 is set to predetermined position on the rod 20, and the tubular member 13 is adjusted and held in adjusted position on the tubular member 8. This adjusted position will depend on the individual operator, who may desire to have the alarm operated when there is a reserve of one gallon left in the tank 2, two gallons, three gallons, or any predetermined quantity. After being set, the cap 10 is threaded into the flange 27, with the device attached to the cap 1, and the device is ready for functioning.

As long as the liquid level in the tank 2 remains above the predetermined low level, the device will remain in the position illustrated in Fig. 4, viz., with the contact points 46 raised from the contact plates 34, so that the alarm is inoperative.

Immediately, however, upon the level of the liquid falling to the predetermined low level, or below same, the float 19 will follow the fuel or liquid in its downward course, and when reaching said predetermined level, the contact points will be brought into contact with the plates 34, as shown in Fig. 3, causing the alarm 40 on the dash to be operated, and apprising the operator of the vehicle that the predetermined level has been reached in the tank 2, and apprising him, also, of the exact amount of fuel which he has left. Thus the operator will know how soon to refill the tank, and danger of exhausting the fuel in the tank 2 is thus obviated and eliminated.

In Figs. 9 and 10 I have illustrated a slight modification of my invention, wherein but a single contact point 60 is affixed to the arm 61, while two contact plates 62 are secured to the block 33 by screws 63, to which screws the current conducting wires 36 are attached.

This is equally as efficient as the device illustrated in the previous figures, the single contact point performing its function of operating the alarm quite as satisfactorily as the device with two contact points.

It will thus be seen that I have devised a tank alarm of simple mechanism, embodying several features which I believe are novel with me, and which features I have, therefore, claimed broadly in the present application.

My present invention is also applicable to other portions of a motor vehicle, such as the radiator, or the battery, or in any location or installation where it is imperative or desirable that the operator be apprised as soon as a certain liquid has reached a predetermined low level. These various applications of the invention are all broadly within the scope or province of my present invention.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. A tank alarm switch, comprising a head, a member vertically slidable therein, a rod depending from said member, a float on said rod adjacent to the lower end thereof, means to limit the vertical movement of said rod, a tubular member depending from said head and surrounding said rod, and a second tubular member telescopically adjustable upon the first tubular member.

2. A tank alarm switch, comprising a head, a member vertically slidable therein, a rod depending from said member, a float on said rod adjacent to the lower end thereof, means to limit the vertical movement of said rod, a tubular member depending from said head and surrounding said rod, a second tubular member telescopically adjustable upon the first tubular member, and means to secure said second tubular member in predetermined adjusted position on said first tubular member.

3. A tank alarm switch comprising a head, a member vertically slidable therein, a rod depending from said member, a float on said rod adjacent to the lower end thereof, means to limit the vertical movement of said rod, a tubular member depending from said head and surrounding said rod, a second tubular member telescopically adjustable upon the first tubular member, means to secure said second tubular member in predetermined adjusted position on said first tubular member, and means carried by said second tubular member to protect said float and rod.

4. A tank alarm switch comprising a head, a member vertically slidable therein, a rod depending from said member, a float on said rod adjacent to the lower end thereof, means to limit the vertical movement of said rod, a tubular member depending from said head and surrounding said rod, a second tubular member telescopically adjustable upon the first tubular member, means to secure said second tubular member in predetermined adjusted position on said first tubular member, and a bell carried by said second tubular member to protect said float and rod.

5. A tank alarm switch comprising a head, a member vertically slidable therein, a rod depending from said member, a float on said rod adjacent to the lower end thereof, means to limit the vertical movement of said rod, a tubular member depending from said head and surrounding said rod, a second tubular member telescopically adjustable upon the first tubular member, means to secure said second tubular member in predetermined adjusted position on said first tubular member, a bell carried by said second tubular member to protect said float and rod, and means in each of said tubular members to guide said rod in its vertical movement.

6. A tank alarm switch comprising a head, a member vertically slidable therein, a rod depending from said member, a float on said rod adjacent to the lower end thereof, a tubular member depending from said head and surrounding said rod, a second tubular member telescopically adjustable upon the first tubular member, means to secure said second tubular member in predetermined adjusted position on said first tubular member, a bell carried by said second tubular member to protect said float and rod, means in each of said tubular members to guide said rod in its vertical movement, the guiding means in the adjustable tubular member acting also as a stop to limit the upward movement of said float.

7. A tank alarm switch comprising a head, a member vertically slidable therein, a rod depending from said member, a float on said rod adjacent to the lower end thereof, means to limit the vertical movement of said rod, a tubular member depending from said head and surrounding said rod, a second tubular member telescopically adjustable upon the first tubular member, means to secure said second tubular member in predetermined adjusted position on said first tubular member, a bell carried by said second tubular member to protect said float and rod, means to guide the rod in its vertical movement, insulating material in said head, contact plates concealed within said insulating material, a contact point associated with and controlled by said rod to engage said contact plates at a predetermined instant, and means to guide said contact point to said contact plates.

8. A tank alarm switch comprising a head, an insulating member vertically slidable therein, a rod depending from said member, a float on said rod adjacent to the lower end thereof, means to limit the vertical movement of said rod, a tubular member depending from said head and surrounding said rod, a second tubular member telescopically adjustable upon the first tubular member, means to secure said second tubular member in predetermined adjusted position on said first tubular member, a bell carried by said second tubular member to protect said float and rod, means to guide the rod in its vertical movement, insulating material in said head, contact plates concealed within said insulating material, an arm carried by said vertically movable insulating member, a contact point carried by said arm and vertically movable therewith, and means to guide said contact point to said contact plate.

9. A tank alarm switch comprising a head, an insulating member vertically slidable therein, a rod depending from said member, a float on said rod adjacent to the lower end thereof, means to limit the vertical movement of said rod, a tubular member depending from said head and surrounding said rod, a second tubular member telescopically adjustable upon the first tubular member, means to secure said second tubular member in predetermined adjusted position on said first tubular member, a bell carried by said second tubular member to protect said float and rod, means to guide the rod in its vertical movement, insulating material in said head, contact plates concealed within said insulating material, an arm carried by said vertically movable insulating member, a contact point carried by said arm and vertically movable therewith, means to limit the vertical movement of said contact point, and means to permit the escape of gas from adjacent said contact point.

10. A tank alarm switch comprising a head, an insulating member vertically slidable therein, a rod depending therefrom, a float on said rod adjacent to the lower end thereof, means to limit the vertical movement of said rod, a tubular member depending from said head and surrounding said rod, a second tubular member telescopically adjustable thereon, means to secure said second tubular member in predetermined adjusted position on said first tubular member, a bell carried by said second tubular member to protect said float and rod, means to guide the rod in its vertical movement, insulating material in said head, contact plates concealed within said material, an arm carried by said vertically movable insulating member, a contact point carried by said arm and vertically movable therewith, means to limit the vertical movement of said contact point, a cap enclosing said insulating members and secured thereto and provided with apertures to permit the escape of gas from the interior of said cap.

11. A tank alarm switch comprising a head, a member vertically slidable therein, a rod depending therefrom, a float on said rod adjacent to the lower end thereof, means to limit the vertical movement of said rod, a tubular member depending from said head and surrounding said rod, a second tubular member telescopically adjustable thereon, means to secure said second tubular member in predetermined adjusted position on said first tubular member, a bell carried by said second tubular member to protect said float and rod, and means to guide the rod in its vertical movement, said device being attached to the filling cap of a tank and removable with said cap, said cap being rotatable about said head.

In testimony whereof, I have signed my name to this specification.

EDWARD C. JOHNSTONE.